C. W. LARNER.
POSITION INDICATOR FOR PLUNGER VALVES.
APPLICATION FILED DEC. 6, 1917.
1,314,340.
Patented Aug. 26, 1919.
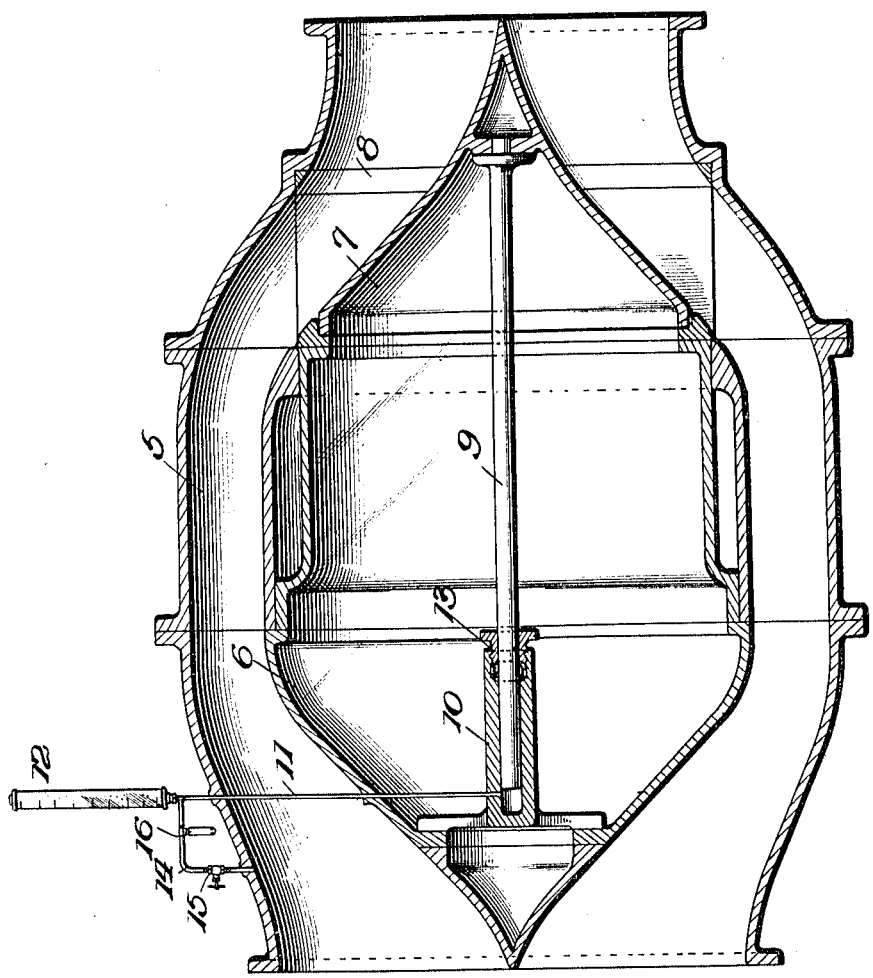
Inventor
Chester W. Larner.
By A. B. Stoughton
Attorney

UNITED STATES PATENT OFFICE.

CHESTER W. LARNER, OF CLEVELAND, OHIO.

POSITION-INDICATOR FOR PLUNGER-VALVES.

1,314,340.     Specification of Letters Patent.     Patented Aug. 26, 1919.

Application filed December 6, 1917. Serial No. 205,724.

*To all whom it may concern:*

Be it known that I, CHESTER W. LARNER, a citizen of the United States, residing at Cleveland, in the county of Cuyahoga and State of Ohio, have invented certain new and useful Improvements in Position-Indicators for Plunger-Valves, of which the following is a specification.

This invention relates to valves for the control of water, steam or other fluids, and especially to the class of valves which are opened or closed by the straight line motion of a plunger or equivalent, the object being to provide simple and reliable means for registering or indicating the position of the plunger element.

The nature, characteristic features and scope of the invention will more readily be understood from the following description taken in connection with the accompanying drawing, which is a view principally in longitudinal sectional elevation of one embodiment of the invention.

Referring to the drawing, the numeral 5 represents an enlarged or chambered part of a fluid way or conduit adapted for the reception of a type of valve whereof one element is fixed and whereof the other element is movable relatively in a straight line. 6 indicates the fixed portion of the valve and 7 is its movable bowl or plunger element, movable by any appropriate means (not shown) toward and away from the seat 8.

A plunger rod 9 secured to the movable valve element 7 is accommodated in a cylinder 10 secured to the fixed element 6. A duct 11, in communication with the basal part of the cylinder, extends beyond the structure 5 and communicates with a glass tube or gage 12, having approximately the same volumetric capacity as the cylinder. The glass tube 12 and its connections is supplied with water, which evidently rises and falls in the tube as the plunger rod 9 moves back and forth in the cylinder 10. The tube 12 is appropriately marked so that the observer can tell at a glance, by the level of the water, the corresponding position of the plunger element of the valve.

The accurate registration of the water levels with the marks or calibrations on the glass depends of course upon absence of leakage around the plunger rod 9 where it fits into the cylinder. A packing gland 13 is indicated by way of example of means for obviating leakage, but no doubt some leakage would occur regardless of the form of packing. I therefore provide a compensating connection 14, which taps the conduit and is provided with a stop valve 15. Additionally there is a discharge valve 16 whereby water may be withdrawn from the glass in the event the level becomes abnormally high by reason of leakage into the system. By means of these two valves the level in the glass may be re-adjusted from time to time and kept in accurate register.

It will be obvious to those skilled in the art to which the invention relates that various changes and modifications may be made without departing from the spirit and scope thereof. Hence, the invention is not limited other than required by the state of the prior art.

Having described the nature and object of the invention, I claim:—

1. In apparatus of the type recited, the combination of a fluid way or conduit having an enlargement or chamber for a valve, a valve in said chamber comprising a fixed element and a plunger element, and means for indicating the position of the plunger element, comprising a glass tube or gage externally of the conduit, a fluid containing cylinder mounted on the fixed element and in communication with said gage, and a fluid displacing piston movable with the plunger element.

2. In apparatus of the type recited, the combination of a fluid way or conduit, a valve in said conduit comprising a fixed element and a plunger element, means for indicating the position of the plunger element, comprising a glass tube or gage externally of the conduit, a fluid containing cylinder in communication therewith, a fluid displacing piston movable with the plunger element, means for replenishing loss of fluid due to external leakage, and means for relieving excess of fluid.

3. In apparatus of the type recited, the combination of a valve comprising a fixed element and a plunger element, a cylinder containing fluid and communicating with a distant glass tube or gage, a rod movable in said cylinder and connected to the plunger element, and connections for compensating for leakage of said fluid.

In testimony whereof I affix my signature.

CHESTER W. LARNER.